(12) United States Patent
Patel et al.

(10) Patent No.: US 12,499,029 B2
(45) Date of Patent: Dec. 16, 2025

(54) SYSTEM AND METHOD FOR USE BASED MANAGEMENT OF DIAGNOSTIC DATA

(71) Applicant: Dell Products L.P., Round Rock, TX (US)

(72) Inventors: Dharmesh M. Patel, Round Rock, TX (US); Prem Pradeep Motgi, Austin, TX (US); Manpreet Singh Sokhi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 380 days.

(21) Appl. No.: 18/190,473

(22) Filed: Mar. 27, 2023

(65) Prior Publication Data

US 2024/0330142 A1 Oct. 3, 2024

(51) Int. Cl.
*G06F 11/34* (2006.01)
*G06F 11/07* (2006.01)

(52) U.S. Cl.
CPC ...... *G06F 11/3466* (2013.01); *G06F 11/0787* (2013.01); *G06F 2201/81* (2013.01)

(58) Field of Classification Search
CPC ............. G06F 11/0787; G06F 11/3466; G06F 2201/81
USPC ....................................................... 702/186
See application file for complete search history.

(56) References Cited

U.S. PATENT DOCUMENTS

| | | | |
|---|---|---|---|
| 5,821,871 A | 10/1998 | Benzler | |
| 6,606,620 B1 | 8/2003 | Sundaresan | |
| 6,721,713 B1 | 4/2004 | Guheen | |
| 7,028,049 B1 | 4/2006 | Shelton | |
| 7,315,826 B1 | 1/2008 | Guheen | |
| 8,117,235 B1 | 2/2012 | Barta | |
| 8,255,948 B1 | 8/2012 | Black et al. | |
| 8,955,076 B1 | 2/2015 | Faibish | |

(Continued)

FOREIGN PATENT DOCUMENTS

| | | |
|---|---|---|
| CN | 202058147 U | 11/2011 |
| CN | 115292285 A | 11/2022 |

(Continued)

OTHER PUBLICATIONS

Page, Séebastien, "How to move your Health data from one iPhone to another," iDB, Web Page <https://www.downloadblog.com/2016/10/13/health-data-importer-makes-moving-your-health-data-from-one-iphone-to-another-a-breeze/> accessed on Oct. 30, 2022 (9 Pages).

(Continued)

*Primary Examiner* — John H Le
(74) *Attorney, Agent, or Firm* — WOMBLE BOND DICKINSON (US) LLP

(57) ABSTRACT

Methods and systems for managing collection of diagnostic data are disclosed. To collect diagnostic data, unmanaged devices may be used. The unmanaged devices may be registered with a data management system. During the registration process, procedures for processing diagnostic data from the unmanaged devices may be established. The procedures may be established based on data collection performance of the unmanaged devices. The procedures may reduce the likelihood of use of diagnostic data that is unreliable. Once obtained, the diagnostic data may be rated for different uses based on the performance of the hardware used to obtain the diagnostic data.

20 Claims, 9 Drawing Sheets

(56) References Cited

U.S. PATENT DOCUMENTS

| | | |
|---|---|---|
| 9,009,844 B1 | 4/2015 | Corn |
| 9,361,428 B2 | 6/2016 | Bessette |
| 9,571,890 B1 | 2/2017 | Diamondstein |
| 9,749,353 B1 | 8/2017 | Benskin |
| 9,754,209 B1 | 9/2017 | Kronrod |
| 10,073,948 B2 | 9/2018 | Cohen et al. |
| 10,169,599 B2 | 1/2019 | Fox |
| 10,521,572 B2 | 12/2019 | Nygate |
| 10,997,315 B2 | 5/2021 | Barday |
| 11,010,392 B1 | 5/2021 | Hirsch et al. |
| 11,094,402 B2 | 8/2021 | Brown et al. |
| 11,217,331 B2 | 1/2022 | Vishnubhatla et al. |
| 11,533,619 B1 | 12/2022 | Kahn |
| 11,550,842 B2 | 1/2023 | Clark |
| 11,631,401 B1 | 4/2023 | Nudd |
| 11,763,821 B1 | 9/2023 | McNair |
| 11,849,069 B1 | 12/2023 | Can |
| 12,118,121 B2 | 10/2024 | Brannon |
| 12,135,708 B2 | 11/2024 | Chermside |
| 2003/0046401 A1 | 3/2003 | Abbott |
| 2004/0117215 A1 | 6/2004 | Marchosky |
| 2005/0160166 A1 | 7/2005 | Kraenzel |
| 2005/0165627 A1 | 7/2005 | Fotsch |
| 2005/0203771 A1 | 9/2005 | Achan |
| 2008/0154961 A1 | 6/2008 | Dougall |
| 2008/0275701 A1 | 11/2008 | Wu et al. |
| 2009/0171692 A1 | 7/2009 | Zilberman |
| 2009/0300170 A1 | 12/2009 | Bhame |
| 2009/0328175 A1 | 12/2009 | Shuster |
| 2010/0121657 A1 | 5/2010 | Rosenberger |
| 2010/0169304 A1 | 7/2010 | Hendricksen et al. |
| 2011/0131174 A1 | 6/2011 | Birch et al. |
| 2011/0307435 A1 | 12/2011 | Overell |
| 2012/0265771 A1 | 10/2012 | Suh |
| 2014/0181673 A1 | 6/2014 | Work |
| 2014/0201199 A1 | 7/2014 | Hajaj |
| 2014/0207885 A1 | 7/2014 | Baker et al. |
| 2014/0245398 A1 | 8/2014 | Son |
| 2014/0288947 A1* | 9/2014 | Simpson ............... G16H 40/67 705/2 |
| 2014/0344288 A1 | 11/2014 | Evans |
| 2015/0067176 A1 | 3/2015 | Dubois |
| 2015/0101065 A1 | 4/2015 | Sullivan |
| 2015/0169574 A1 | 6/2015 | Bau et al. |
| 2015/0199268 A1 | 7/2015 | Davis et al. |
| 2015/0244706 A1 | 8/2015 | Grajek |
| 2015/0350210 A1 | 12/2015 | Thibadeau, Sr. |
| 2015/0356127 A1 | 12/2015 | Pierre et al. |
| 2016/0006839 A1 | 1/2016 | Sawazaki |
| 2016/0062689 A1 | 3/2016 | Cherubini |
| 2016/0087976 A1 | 3/2016 | Kaplan |
| 2016/0112208 A1 | 4/2016 | Williams |
| 2016/0164813 A1 | 6/2016 | Anderson |
| 2016/0231928 A1 | 8/2016 | Lewis et al. |
| 2016/0232159 A1 | 8/2016 | Parikh |
| 2016/0306812 A1 | 10/2016 | McHenry et al. |
| 2017/0013047 A1 | 1/2017 | Hubbard |
| 2017/0078195 A1 | 3/2017 | Raman |
| 2017/0161439 A1 | 6/2017 | Raduchel |
| 2017/0262164 A1 | 9/2017 | Jain |
| 2017/0288867 A1 | 10/2017 | Collier |
| 2017/0330297 A1 | 11/2017 | Cronin |
| 2017/0344886 A1 | 11/2017 | Tong |
| 2017/0365101 A1 | 12/2017 | Samec et al. |
| 2018/0068108 A1 | 3/2018 | Fish |
| 2018/0121502 A1 | 5/2018 | Prieur |
| 2018/0189352 A1 | 7/2018 | Ghafourifar |
| 2018/0203612 A1 | 7/2018 | Kats et al. |
| 2019/0012931 A1 | 1/2019 | Candelore |
| 2019/0079855 A1 | 3/2019 | Dewitt |
| 2019/0279744 A1 | 9/2019 | Howley et al. |
| 2019/0297035 A1 | 9/2019 | Fox et al. |
| 2019/0325036 A1 | 10/2019 | Edge |
| 2020/0012800 A1 | 1/2020 | Karako |
| 2020/0042685 A1 | 2/2020 | Tussy |
| 2020/0100724 A1 | 4/2020 | Golay |
| 2020/0110882 A1 | 4/2020 | Ripolles Mateu et al. |
| 2020/0226216 A1 | 7/2020 | Marin et al. |
| 2020/0258516 A1 | 8/2020 | Khaleghi |
| 2021/0056131 A1 | 2/2021 | Ackermann et al. |
| 2021/0065203 A1 | 3/2021 | Billigmeier et al. |
| 2021/0256534 A1 | 8/2021 | An |
| 2021/0390196 A1 | 12/2021 | Lavine et al. |
| 2022/0059216 A1* | 2/2022 | Lewis ............... G06Q 30/0185 |
| 2022/0078007 A1 | 3/2022 | Reddem |
| 2022/0131717 A1 | 4/2022 | Kwatra |
| 2022/0261152 A1 | 8/2022 | Jude et al. |
| 2022/0284090 A1 | 9/2022 | Taylor |
| 2022/0293087 A1 | 9/2022 | Kumar |
| 2022/0301548 A1 | 9/2022 | Wintrode |
| 2022/0334719 A1 | 10/2022 | Thrane |
| 2022/0335426 A1 | 10/2022 | Rapowitz |
| 2022/0366131 A1 | 11/2022 | Ekron |
| 2023/0020703 A1 | 1/2023 | Padinjaruveetil |
| 2023/0061725 A1 | 3/2023 | Khan |
| 2023/0068099 A1 | 3/2023 | Abramenko et al. |
| 2023/0137931 A1 | 5/2023 | Song |
| 2023/0221911 A1 | 7/2023 | Bandameedipalli |
| 2023/0223142 A1 | 7/2023 | Joao |
| 2023/0252127 A1 | 8/2023 | Taylor |
| 2023/0254699 A1 | 8/2023 | Chaudhary |
| 2023/0319026 A1 | 10/2023 | Waltermann |
| 2023/0333767 A1 | 10/2023 | MacGaffey |
| 2023/0394127 A1 | 12/2023 | Tussy |
| 2023/0409761 A1 | 12/2023 | Nagar |
| 2024/0127923 A1 | 4/2024 | Jaime |
| 2024/0144935 A1 | 5/2024 | Martin |
| 2024/0177815 A1 | 5/2024 | Bilal |
| 2024/0340185 A1 | 10/2024 | Cameron |
| 2025/0017547 A1 | 1/2025 | Raveendranath |

FOREIGN PATENT DOCUMENTS

| | | |
|---|---|---|
| JP | 4808173 B2 | 11/2011 |
| JP | 2015-106406 A | 6/2015 |
| WO | 2023/220948 A1 | 11/2023 |

OTHER PUBLICATIONS

"MyChart," Web Page <https://www.mychart.org/> accessed on Oct. 30, 2022 (6 Pages).

Xu, Jie, et al., "Federated learning for healthcare informatics," Journal of Healthcare Informatics Research 5 (2021): 1-19. (19 Pages).

Naz, Sadaf, et al., "A comprehensive review of federated learning for COVID-19 detection," International Journal of Intelligent Systems 37.3 (2022): 2371-2392. (22 Pages).

Prasser, Fabian, et al., "Efficient and effective pruning strategies for health data de-identification," BMC medical informatics and decision making 16.1 (2016): 1-14. (14 Pages).

D. Fedasyuk and I. Lutsyk, "Tools for adaptation of a mobile application to the needs of users with cognitive impairments," 2021 IEEE 16th International Conference on Computer Sciences and Information Technologies (CSIT), LVIV, Ukraine, 2021, pp. 321-324, doi: 10.1109/CSIT52700.2021.9648702. (Year: 2021).

Balaskas, Georgios, et al., "An end-to-end system for transcription, translation, and summarization to support the co-creation process. A Health CASCADE Study", ACM PETRA '23, published Aug. 10, 2023, pp. 625-631. (Year: 2023) (7 Pages).

"FollowMyHealth®," Allscripts Healthcare Solutions Inc, Google Play Store, Web Page <https://play.google.com/store/apps/details?id=com.jardogs.fmhmobile&hl=en_US&gl=US> accesed on Jan. 8, 2023 (4 Pages).

* cited by examiner

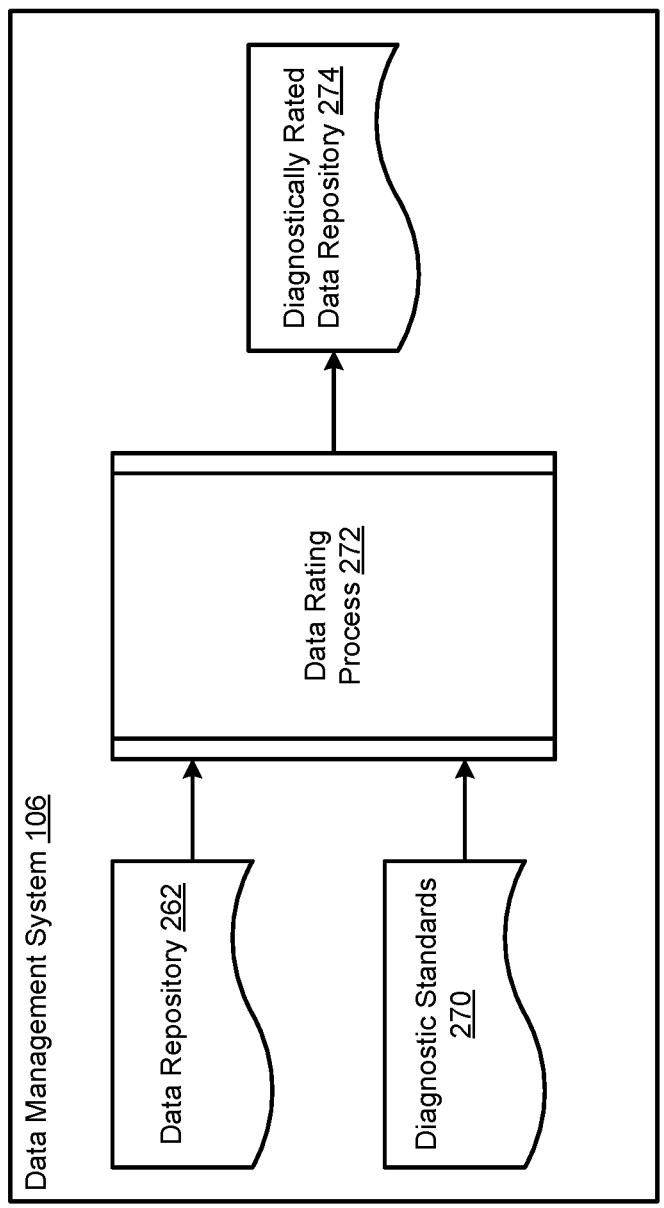

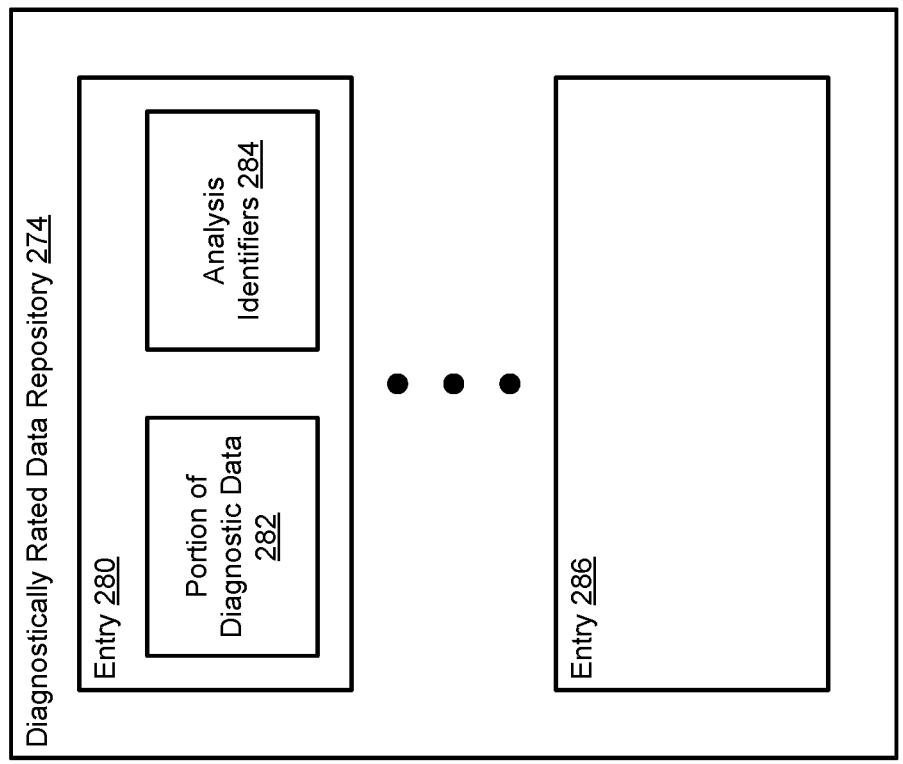

SYSTEM AND METHOD FOR USE BASED MANAGEMENT OF DIAGNOSTIC DATA

FIELD

Embodiments disclosed herein relate generally to data collection. More particularly, embodiments disclosed herein relate to systems and methods to manage collection of diagnostic data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2c show diagrams illustrating data flows in accordance with an embodiment.

FIG. 2D show a diagram illustrating a data structure in accordance with an embodiment.

DETAILED DESCRIPTION

Figure 1:
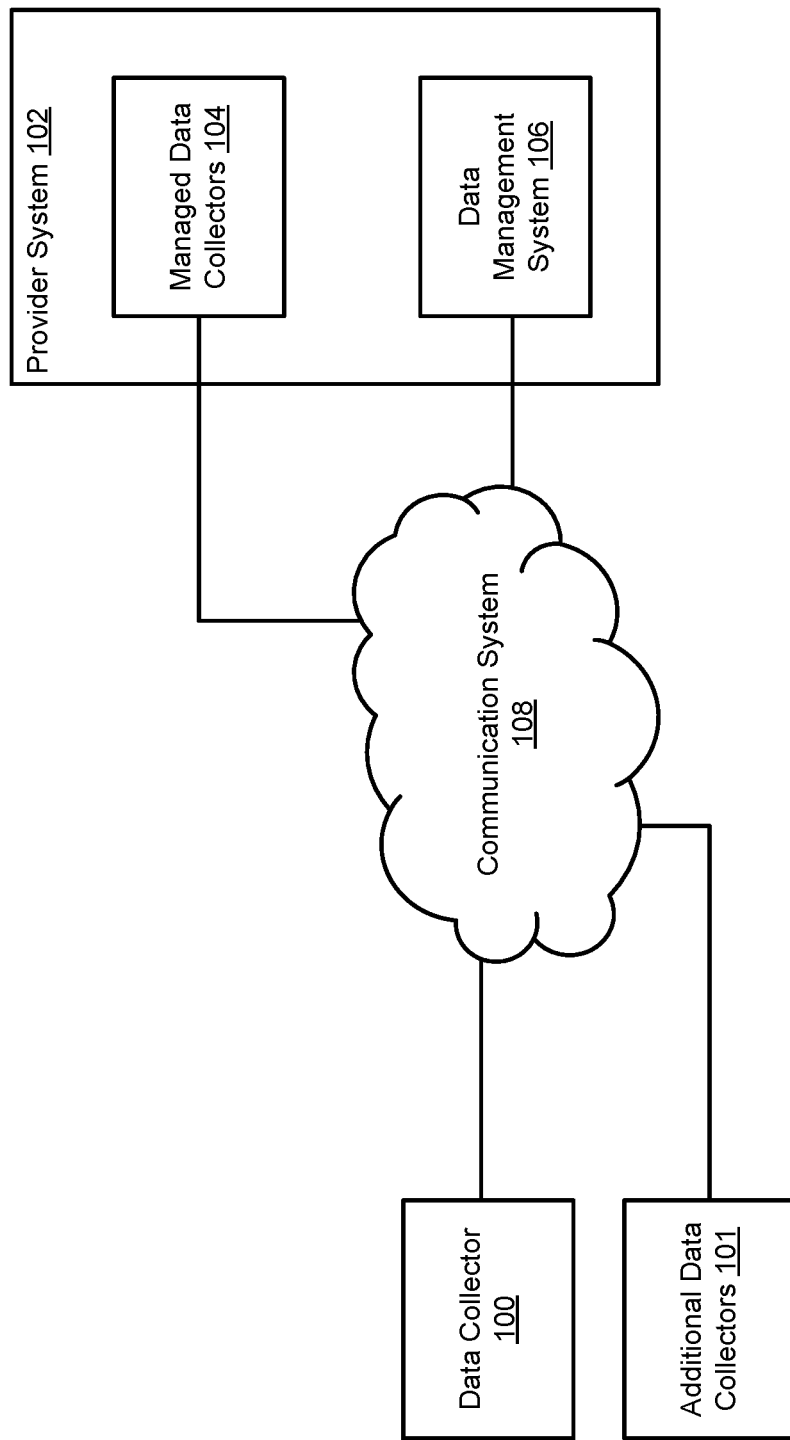
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing collection of diagnostic data. The diagnostic data may be usable, for example, to diagnose and/or treat persons for various medical conditions.

The diagnostic data may be collected using managed devices and unmanaged devices. Managed devices may include diagnostic equipment managed by a healthcare provider. Unmanaged devices may include personal electronic devices such as cell phones managed by a person.

To collect diagnostic data using the unmanaged devices, the unmanage devices may be registered with a data collection system. The unmanaged devices may be registered by (i) establishing identification, cryptographic, and/or other types of information usable by the data management system to securely collect diagnostic data from the unmanaged devices, and (ii) establishing procedures for processing diagnostic data collected from the unmanaged devices.

The procedures may be established based on the capabilities of the unmanaged devices. The capabilities may be ascertained through a qualification process. The qualification process may include performance of various actions using the unmanaged devices to obtain a data package. The data package may be used to ascertain limits on the performance of data collection hardware of the unmanaged devices. The limits on the performance of the data collection hardware may be used to establish the procedures. The procedures may improve the likelihood that diagnosis made using the collected diagnostic data are not impacted by the limits on the performance of the data collection hardware.

Once the diagnostic data is obtained, the diagnostic data may be analyzed to identify relevance for different uses. The diagnostic data may be divided and stored in a manner so that different portions of the diagnostic data relevant for different uses are identifiable. When requests for diagnostic data are received, responsive data based on the type and the use for the diagnostic data may be used to discriminate responsive diagnostic data from non-responsive diagnostic data.

The diagnostic data may be rated for different uses based on the performance of the data collection hardware used to collect the diagnostic data. The ratings may be obtained based on performance standards for the data collection hardware with respect to different uses (e.g., types of analysis usable to diagnose and/or otherwise treat patients).

By collecting diagnostic data using both managed and unmanaged devices, a better picture of the actual condition of a person may be established. The improved picture of the condition of the person may improve the likelihood of accurate diagnosis and corresponding treatment.

By both registering the unmanaged devices and qualifying the collected diagnostic data, security and quality for the collected diagnostic data may be managed. By managing both the security and quality of the collected data, diagnosis and treatment established based on the collected diagnostic data may be less likely to be impacted by the manner in which the diagnostic data is collected. Thus, embodiments disclosed herein may address, among others, the technical problem of data collection using unmanaged devices which may not be subject to similar levels of quality control, upkeep, and maintenance applied to managed devices. By implementing both security and quality control mechanisms for collected diagnostic data, more reliable diagnostic data may be collected.

In an embodiment, a method for managing data collection for managed devices and unmanaged devices is disclosed. The method may include obtaining diagnostic data from an unmanaged device of the unmanaged devices; making a first determination regarding whether the diagnostic data is from a registered device; in a first instance of the first determination where the diagnostic data is the registered device: performing a standards analysis for the diagnostic data to identify at least one class of analysis, the standards analysis being based at least in part on a qualification of data collection hardware of the unmanaged device used to perform measurements through which the diagnostic data is acquired; obtaining a record based on the diagnostic data, the at least one class of analysis, and a person for which the diagnostic data is collected; obtaining a data request for the person, a class of analysis, and a type of the diagnostic data; making a second determination, based on the records, whether the at least one class of analysis meets the class of analysis; in a first instance of the second determination where the at least one class of analysis meets the class of analysis: providing the diagnostic data to service the data request.

Performing the standards analysis may include, for a first portion of the diagnostic data obtained using a first component of the data collection hardware: identifying a level of performance of the component; comparing the level of performance to thresholds associated with classes of analysis to identify at least one threshold that is met by the level of performance; and establishing the at least one class of analysis based on the at least one threshold.

The classes of analysis may be for patient diagnosis, and the thresholds specify minimum acceptable performance levels for the data collection hardware for the patient diagnosis.

Obtaining the records may include identifying second diagnostic data obtained from a second unmanaged device; making a third determination regarding whether the diagnostic data or the second diagnostic data is more reliable; in a first instance of the third determination where the diagnostic data is more reliable: populating the record using the diagnostic data; and in a second instance of the third determination where the second diagnostic data is more reliable: populating the record using the second diagnostic data.

Making the third determination may include comparing performance data for data collection hardware of the unmanaged device to performance data for data collection hardware of the second unmanaged device.

The performance data for the data collection hardware of the unmanaged device may be based on real world testing. The real world testing may be performed before and/or contemporaneously with acquisition of the diagnostic data.

The method may also include, in a second instance of the second determination where the at least one class of analysis does not meet the class of analysis: making a third determination regarding whether any other records comprise other diagnostic data that meets the class of analysis: in an instance of the third determination where no other records comprise the other diagnostic data that meets the class of analysis: indicating to a requestor that initiated the data request that no responsive data is available.

In an embodiment, a non-transitory media is provided. The non-transitory media may include instructions that when executed by a processor cause the computer-implemented method to be performed.

In an embodiment, a data processing system is provided. The data processing system (or a management controller hosted by the data processing system) may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

The computer implemented services may be used to provide, for example, healthcare services. For example, the computer implemented services may be utilized by healthcare providers to diagnose patients, store information regarding previously made diagnosis, etc.

To provide the computer-implemented services, the system may include provider system 102. Provider system 102 may facilitate storage and use of information. For example, provider system 102 may aggregate digital medical records, or other types of records, used to provide healthcare and/or other types of services.

Provider system 102 may include managed data collectors 104 and data management system 106. Each of these components is discussed below.

Managed data collectors 104 may facilitate acquisition of diagnostic data regarding patients. Managed data collectors 104 may include any quantity and type of computerized medical equipment. The computerized medical equipment may allow information regarding patients to be obtained, stored, analyzed, etc. For example, a magnetic resonance imaging (MRI) system may be example of a type of computerized medical equipment. The MRI system may utilize sensors to characterize portions of a patient and generate digital records of the characterizations (e.g., records including diagnostic information regarding patients). While described with respect to an example, it will be appreciated that computerized medical equipment may include any type of device through which information regarding a patient may be obtained by sensing characteristics of the patient, samples from a patient, etc.

The information obtained through managed data collectors 104 may be stored for use in data management system 106. Data management system 106 may facilitate storage and use of stored diagnostic information. The stored diagnostic information may be used by medical professionals to diagnose, treat, and/or otherwise manage patient care.

However, the ability of medical providers to provide medical care using the stored diagnostic information may depend on the reliability, fidelity, and other characteristics of the stored diagnostic information. If low reliability diagnostic information is stored in data management system 106, then medical professionals may create care plans that are unlikely to resolve the medical issues impacting patients.

For example, if diagnostic data of low fidelity is stored in data management system 106, a medical professional may be more likely to miss important details for differential diagnosis between different medical issues that may or may not be impacting patients. Also, if the quality of the diagnostic data is not apparent, then medical professionals may misinterpret the diagnostic data leading to undesired patient care outcomes.

Additionally, the ability of medical providers to provide medical care using the stored diagnostic information may depend on the types and quantity of stored diagnostic information. If insufficient diagnostic information is stored in data management system 106, then medical professionals may be more likely to misdiagnose patients.

In general, embodiments disclosed herein may provide methods, systems, and/or devices for managing collection, storage, and use of diagnostic information (e.g., in aggregate "diagnostic data management services"). The disclosed systems may facilitate increased collection of diagnostic information, improve the reliability of collected diagnostic information, and may improve the security of collected diagnostic information.

To provide diagnostic data management services, the system of FIG. 1 may facilitate collection of diagnostic information from data collector 100. In contrast to managed data collectors 104 which may be professionally managed by medical professionals, data collector 100 may be managed by a patient or other persons that are not medical professionals. For example, data collector 100 may be implemented using a personal electronic device (e.g., a cell phone, smart phone, a tablet computer, etc.), a personal sensing system (e.g., heart rate monitoring device such as a smart ring or smart watch), or other type of device that may be owned, managed, or used by a patient. The person may also utilize a range of additional data collectors 101. Additional data collectors 101 may be similar to and/or different from (e.g., may be other types of data collection devices) data collector 100. Diagnostic information from all of these collectors (e.g., 100, 101, 104) may be used to establish a broad picture of the condition of a person.

Data collector 100 and additional data collectors 101 may include one or more sensors through which information regarding a person may be obtained. The sensors may collect any type and quantity of information regarding the person.

Various data collectors 100, 101 may collect similar or different diagnostic information. Depending on the available data collection hardware, diagnostic data at different levels of fidelity, reliability, etc. may be collected. Thus, in some cases similar diagnostic data may be able to be collected from multiple collectors.

Figure 2A:
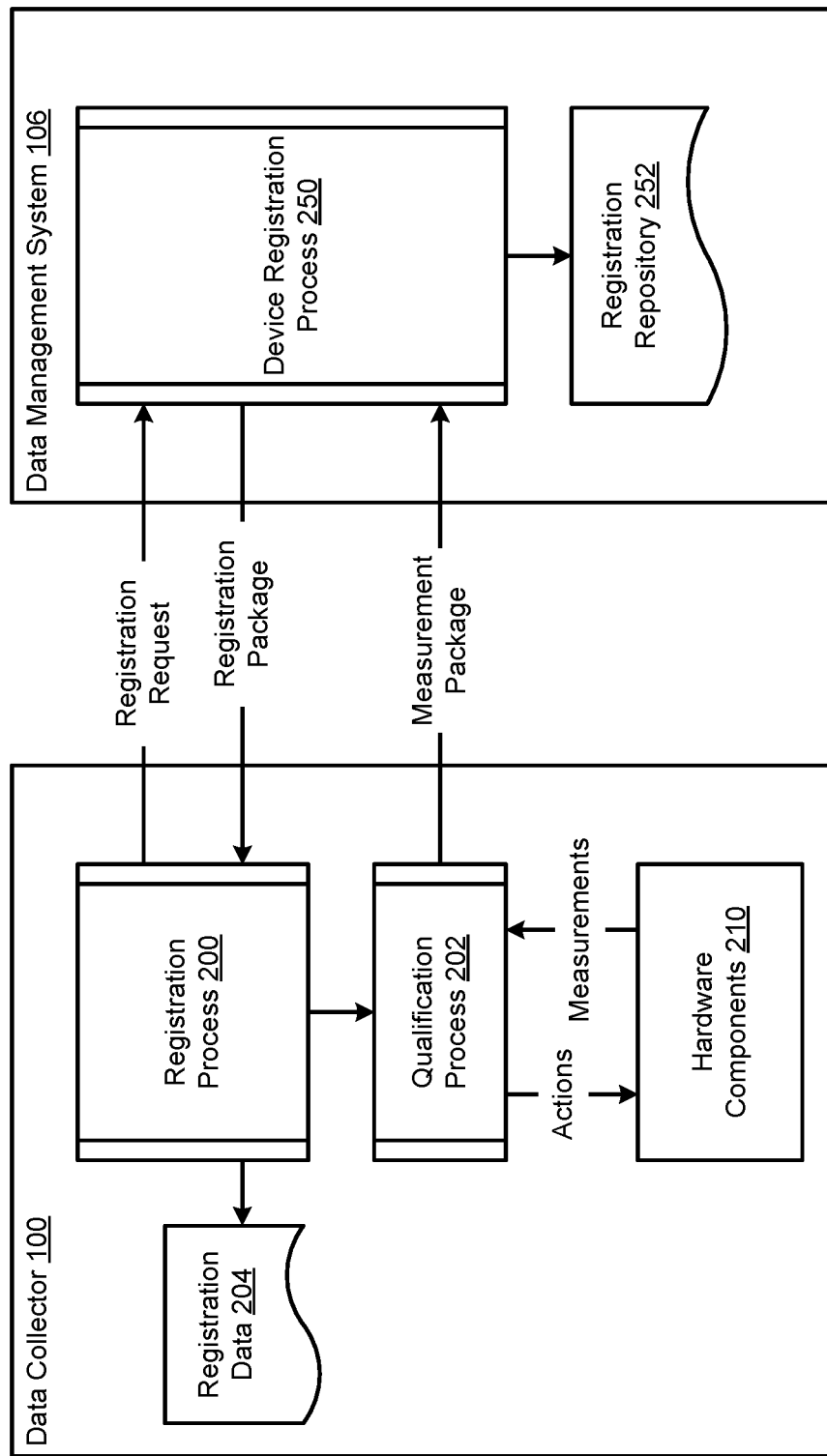
Figure 2B:
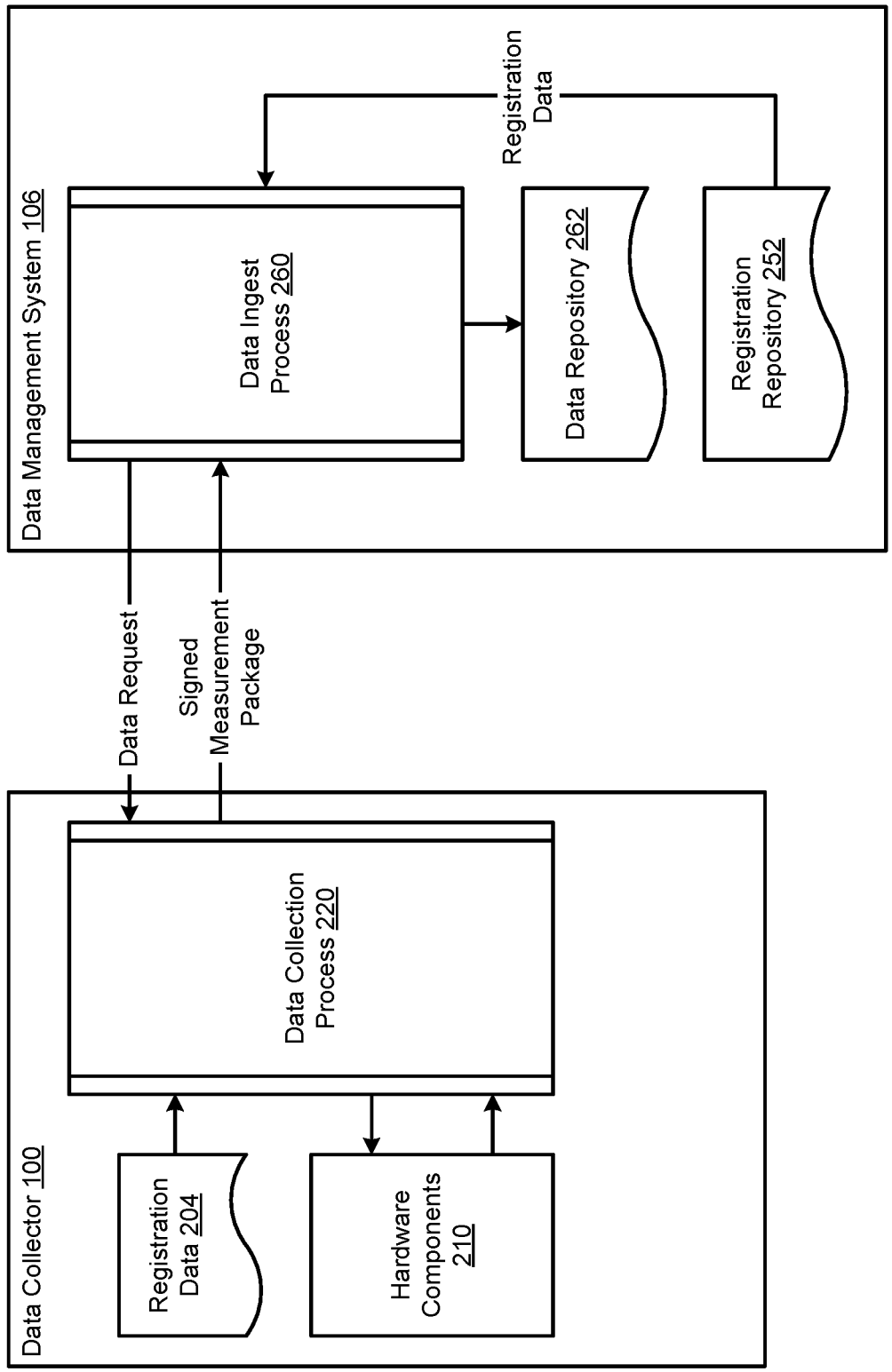

To manage collection of diagnostic data using data collector 100, data management system 106 may (i) register data collector 100 and additional data collectors 101, (ii) once registered, qualify data collector 100 and additional data collectors 101 with respect to their ability to obtain different type of diagnostic information, (iii) obtain qualified types of diagnostic information obtained from data collector 100 and additional data collectors 101, (iv) store the obtained diagnostic data with stamps or other types of metadata usable to characterize the quality of the diagnostic data, and (v) provide selective access to the diagnostic information and/or information based on the diagnostic information to persons (e.g., medical providers part of provider system 102) and/or other devices (e.g., part of provider system 102) depending on the type of analysis that will be performed using the diagnostic information. Refer to FIG. 2A for additional details regarding registration of data collector 100. Refer to FIG. 2B for additional details regarding obtaining diagnostic information using data collector 100. Refer to FIG. 2C for additional details regarding selectively providing diagnostic information.

Figure 3A:
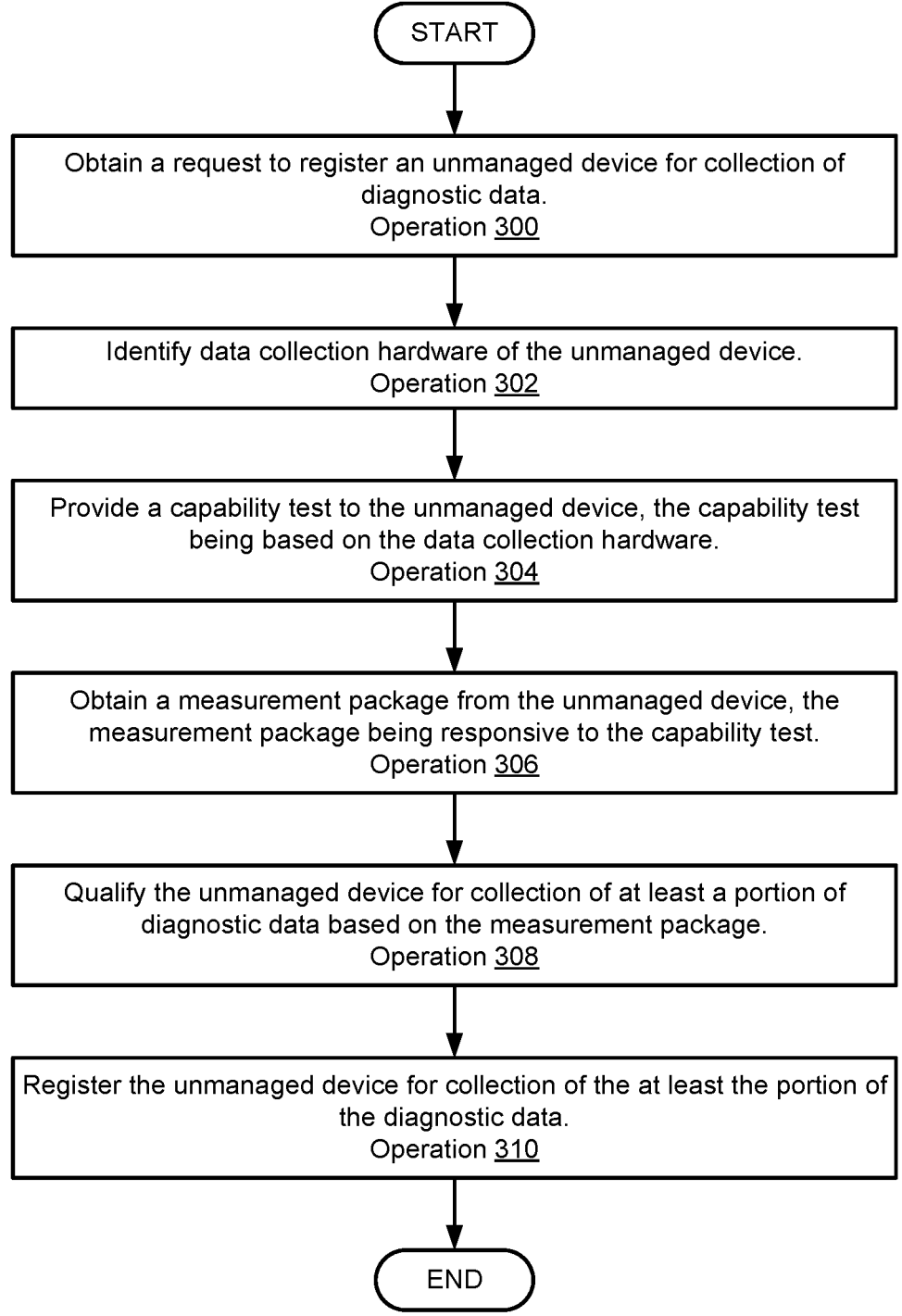
FIGS. 3A-3C show flow diagrams illustrating methods of managing data collection in accordance with an embodiment.
Figure 3B:
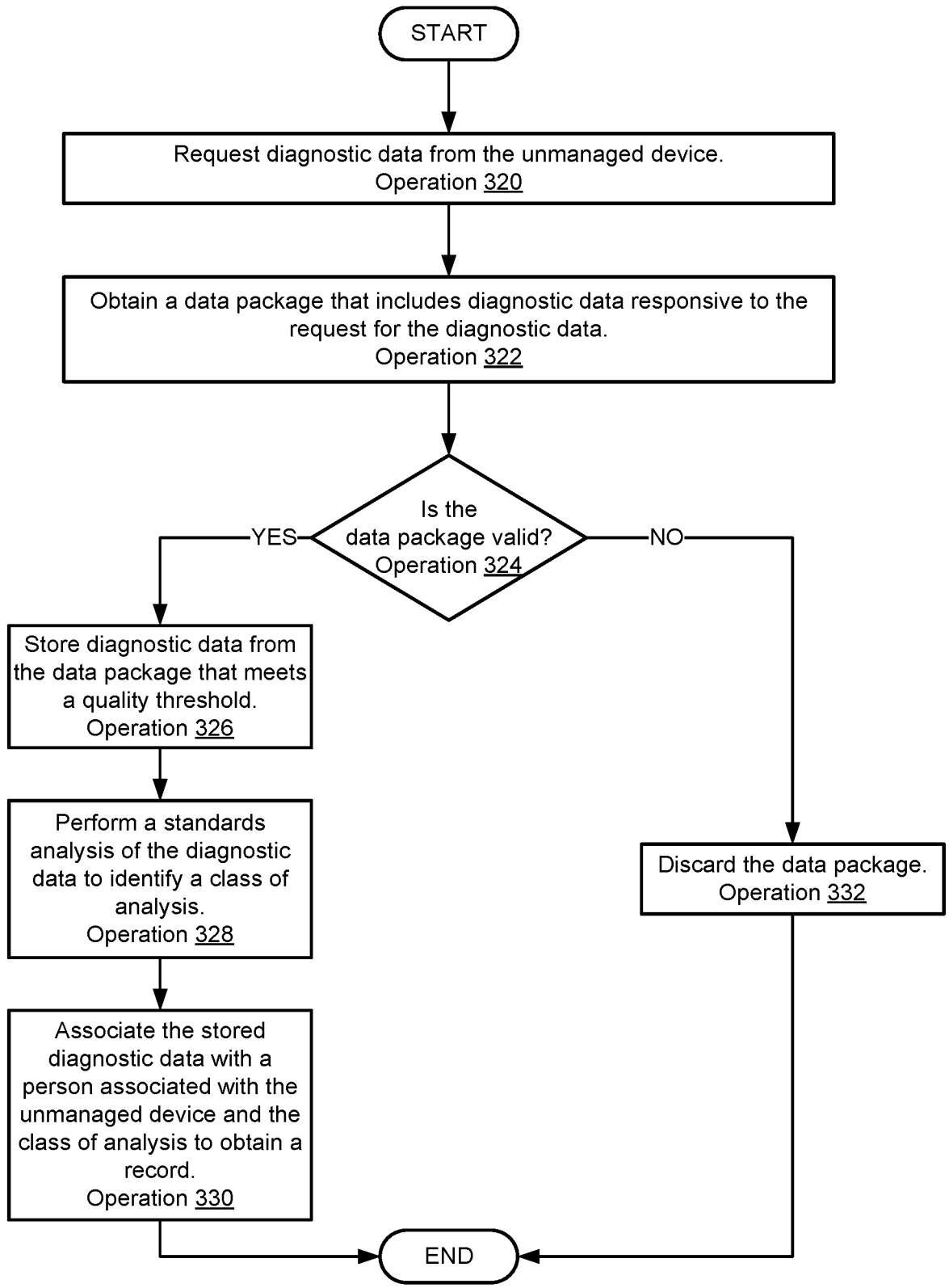

When providing their functionality, any of data collector 100, additional data collectors 101, and data management system 106 may perform all, or a portion, of the methods illustrated in FIGS. 3A-3B.

Any of data processing systems collector 100, additional data collectors 101, and data management system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Data management system 106 may be implemented with multiple computing devices. For example, data management system 106 may be implemented with a data center, cloud installation, or other type of computing environment. The computing environment may host a software stack for registering data collectors, and system for obtaining and managing diagnostic information.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Additionally, while illustrated in FIG. 1 with respect to a data collector 100, it will be appreciated that the system may include any number of additional data collectors 101 which may each collect similar and/or different diagnostic data. For example, a patient may have both a smart phone and smart watch. Each may include some similar sensors and some different sensors through which diagnostic information may be obtained and provided to data management system 106.

To further clarify embodiments disclosed herein, diagrams illustrating data flows implemented by and data structures used by a system over time in accordance with an embodiment are shown in FIGS. 2A-2C. Additionally, a data structure diagram in accordance with an embodiment is shown in FIG. 2D.

Turning to FIG. 2A, a first data flow diagram illustrating data flows, data processing, and/or other operations that may be performed by the system of FIG. 1 in accordance with an embodiment is shown. In FIG. 2A, example flows between data collector 100 and data management system 106 are shown. It will be appreciated that similar flow with respect to additional data collectors 101 and data management system 106 may be present.

To manage collection of data from data collector 100, data management system 106 may require that data collector 100 be registered with it prior to allowing diagnostic data to be obtained and used for diagnostic purposes. To register, data collector 100 may perform registration process 200. During registration process 200, data collector 100 may send a registration request to device registration process 250 performed by data management system 106.

The registration request may include information regarding data collector 100. For example, the registration request may include an inventory of hardware and software hosted by data collector 100, may include identifying information such as a part number, revision number, product identifier, and/or other types of information regarding data collector 100. Additionally, the registration request may include information regarding a person that will provide diagnostic data using data collector 100, or may not include information regarding the person (e.g., the information regarding the person may be provided to data management system 106 via other processes).

Once obtained, device registration process 250 may use the information to (i) establish a registration for data collector 100 in registration repository 252, (ii) generate cryptographic data usable to secure data provided by data collector 100, (iii) generate an identifier, stamp, and/or other metadata through which data collector 100 may identify itself, (iv) identifying tests for qualifying the capabilities of data collector 100, and/or (v) a provide registration package to data collector 100 which may include any of the aforementioned information (e.g., cryptographic data, identifier, test) and/or information based on the aforementioned information.

When obtained by registration process 200, the cryptographic data and/or identifier/stamp/other metadata may be stored as registration data 204 for future use. Additionally, qualification process 202 may be initiated. During qualification process 202, any number of tests (e.g., as specified in the registration package) on hardware components 210 of data collector 100 may be performed. The test may attempt to identify the extent to which hardware components 210 meet expectations (e.g., nominal operation).

The tests may attempt to identify, for example, (i) the dynamic range, sensitivity, and/or other characteristics of sensors (e.g., microphones, light sensors, charge coupled devices, etc.); (ii) the range, fidelity, and/or other characteristics of sources (e.g., speakers, light emission devices, etc.); (iii) interference between sources and sensors; etc.

The testing may be performed by causing various actions to be performed and measurements to be taken. The testing may involve a person. For example, during performance of a test a prompt may be provided to a person operating data collector 100. User feedback may also be obtained during the testing (e.g., a user may indicate that certain portions of a prompt are completed, in process of being completed, that certain conditions are currently met, etc.). The prompts and user feedback may be used during the testing to improve the likelihood that data collector 100 is in an expected condition during the testing.

The measurements obtained during the testing may be used to obtain a measurement package. The measurement package may include any type and quantity of information based on the measurements which may be used to gauge (i) how well operation of the hardware components 210 conforms to nominal operation, (ii) the extent of deviation of the operation of the hardware components 210 from nominal operation, etc.

The measurement package may include an identifier and may be encrypted using information included in registration data 204.

Once obtained by data management system 106, the measurement package may be used to update the information regarding data collector 100 included in registration repository 252. For example, registration repository 252 may be updated to (i) associate the capabilities and limitations specified by measurement package with the identifier/cryptographic information provided in registration package, (ii) specify additional information based on the information included in measurement package, such as data management system 106 imposed limits on the use of hardware components 210 due to undesired operation of hardware components 210 (e.g., significant deviation of operation from nominal operation), etc.

Once updated, the information in registration repository 252 may be usable to (i) ascertain to which person information obtained from data collector 100 should be associated, (ii) decrypt the data from data collector 100, (iii) screen portions of the data from future use (e.g., based on performance of hardware components 210 used to obtain the portions of the data), and/or (iv) annotate the obtained data with metadata usable to characterize the quality and/or other characteristics of the data obtained from data collector 100.

Using the flow illustrated in FIG. 2A, any number of data collectors may be registered with data management system 106 thereby allowing for collection of a broad range of data from unmanaged devices.

Turning to FIG. 2B, a second data flow diagram illustrating data flows, data processing, and/or other operations that may be performed by the system of FIG. 1 in accordance with an embodiment is shown. In FIG. 2B, example flows between data collector 100 and data management system 106 are shown. It will be appreciated that similar flow with respect to additional data collectors 101 and data management system 106 may be present.

After registration of data collector 100 is complete, data management system 106 may perform data ingest process 260 through which diagnostic information from data collector 100 may be ingested. To initiate ingestion of diagnostic information, a data request may be provided to data collector 100. The data request may drive data collection process 220. During data collection process 220, diagnostic data as specified by data request may be collected using hardware components 210. For example, various sensors, generative, and display components of data collector 100 may be operated to perform diagnostic data collection.

The display components may be used to display prompts to a user of data collector 100. The generative components may be used to generate various stimulations (e.g., optical, audio, etc.) of the user. The sensors may be used to obtain information regarding the user and the impact of the stimulations on the user. The sensed information and/or information regarding the generative processes may be collected.

In addition to the aforementioned sensing process to obtain diagnostic information, a characterization process may also be performed. The characterization process may be similar to qualification process 202. Through the characterization process, information regarding the operation of hardware components 210 may be collected.

The diagnostic information, information regarding the operation of hardware components 210, and/or other information may be added to a measurement package. The measurement package may be signed (or otherwise attested to by data collector 100), encrypted (e.g., using a keypair or other cryptographic data), and/or identifying information (e.g., stamps) may be added to obtain a signed measurement package. The signed measurement package may be provided to data management system 106.

Data ingest process 260 may receive and analyze the signed measurement package using registration data (e.g., association between the stamp/cryptographic data/the user) from registration repository 252. Data ingest process 260 may (i) verify that the signed measurement package is from a registered device, (ii) identify the person (e.g., patient) to which the included diagnostic data is to be associated, (iii) discriminate reliable from unreliable diagnostic information (e.g., based on the qualification process, described with respect to FIG. 2A), and (iv) store the reliable diagnostic information in data repository 262 (e.g., along with associations to the person, metrics regarding the quality of the diagnostic information, etc.).

Turning to FIG. 2C, a third data flow diagram illustrating data flows, data processing, and/or other operations that may be performed by the system of FIG. 1 in accordance with an embodiment is shown.

Continuing with the discussion from FIG. 2B, once diagnostic data is obtained, the diagnostic data may be rated with respect different types of uses (e.g., analysis processes performed in diagnosing health issues). To do so, the diagnostic data from data repository 262 may be ingested by data rating process 272. Data rating process 272 may rate the diagnostic data with respect to different uses. The rating criteria may be stored in diagnostic standards 270.

Diagnostic standards 270 may specify quality levels for diagnostic data that need to be met to be considered useful for corresponding uses. If the quality level of diagnostic data fails to meet the diagnostic standards, then the corresponding portions of the diagnostic data may not be stored in diagnostically rated data repository 274 (e.g., may be deleted or stored in other locations for retention). However, portions of the diagnostic data that do meet some diagnostic standards may be stored in diagnostically rated data repository 274. Refer to FIG. 2D for additional details regarding diagnostically rated data repository 274. Additionally, while illustrated in FIG. 2C as being a separate data structure from data repository 262, it will be appreciated that diagnostically rated data repository 274 may be implemented by pruning diagnostic data from data repository 262. Thus, there may only be a single data structure in practice rather than multiple copies.

During data rating process 272, different portions of diagnostic data may be compared to corresponding standards. The standards may specify performance requirements for data collection hardware used to obtain the portions of diagnostic data. Multiple standards for different uses may be compared against the performance of the data collection hardware used to obtain the portions of diagnostic data to identify which (if any) use each portion of diagnostic data may be useful for performing.

Information regarding these uses may be stored along with the diagnostic data stored in diagnostically rated data repository 274. The information may be used to service future data requests by facilitating identification of diagnostic data for a particular use if available (e.g., the use may be used as a key to perform a lookup, or other processing operation).

In an embodiment, any of data collector 100 and data management system 106 are implemented using a hardware device including circuitry. The hardware device may be, for example, a digital signal processor, a field programmable gate array, or an application specific integrated circuit. The circuitry may be adapted to cause the hardware device to perform the functionality of data collector 100 and/or data management system 106 as discussed herein. Data collector 100 and/or data management system 106 may be implemented using other types of hardware devices without departing embodiment disclosed herein.

In an embodiment, any of data collector 100 and data management system 106 are implemented using a processor adapted to execute computing code stored on a persistent storage that when executed by the processor performs the functionality of data collector 100 and/or data management system 106 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of data collector 100 and/or data management system 106 include storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures such as data repository 262, diagnostic standards 270, diagnostically rated data repository 274, etc. discussed herein. Any of these data structures may be implemented using, for example, lists, tables databases, linked lists, unstructured data, and/or other types of data structures.

Turning to FIG. 2D, a diagram of diagnostically rated data repository 274 in accordance with an embodiment is shown. As noted above diagnostically rated data repository 274 may store diagnostic information that has been prequalified (e.g., rated) for corresponding uses.

Diagnostically rated data repository 274 may be implemented using one or more data structures that include any number of entries (e.g., 280-286). Each entry may correspond to a corresponding portion of diagnostic data (e.g., 282) that has been rated relevant for at least one use. Each entry may also specify such uses by including analysis identifiers 284. Analysis identifiers 284 may indicate the types of analysis that may be likely to be completed successfully using the corresponding portion of diagnostic data stored in entry 280.

As discussed above, because each portion of diagnostic data may be relevant for a variety of different uses, analysis identifiers 284 may include one or more identifiers of the uses.

When a request for diagnostic data for a particular use is received, analysis identifiers 284 of each entry may be used to identify whether any responsive data is available in diagnostically rated data repository 274. For example, a lookup may be performed with the contemplated use being used as a key to identify entries which include portions of diagnostic data that are likely to be usable to perform the contemplated use. Thus, in some scenarios, diagnostic data of a particular type being sought for a use may be present in diagnostically rated data repository 274, but may not be of sufficient quality for the portion of diagnostic data to be considered relevant for the use. Accordingly, in these scenarios, requests for the diagnostic data may be serviced by indicating that no responsive data is available in diagnostically rated data repository 274.

Figure 3C:
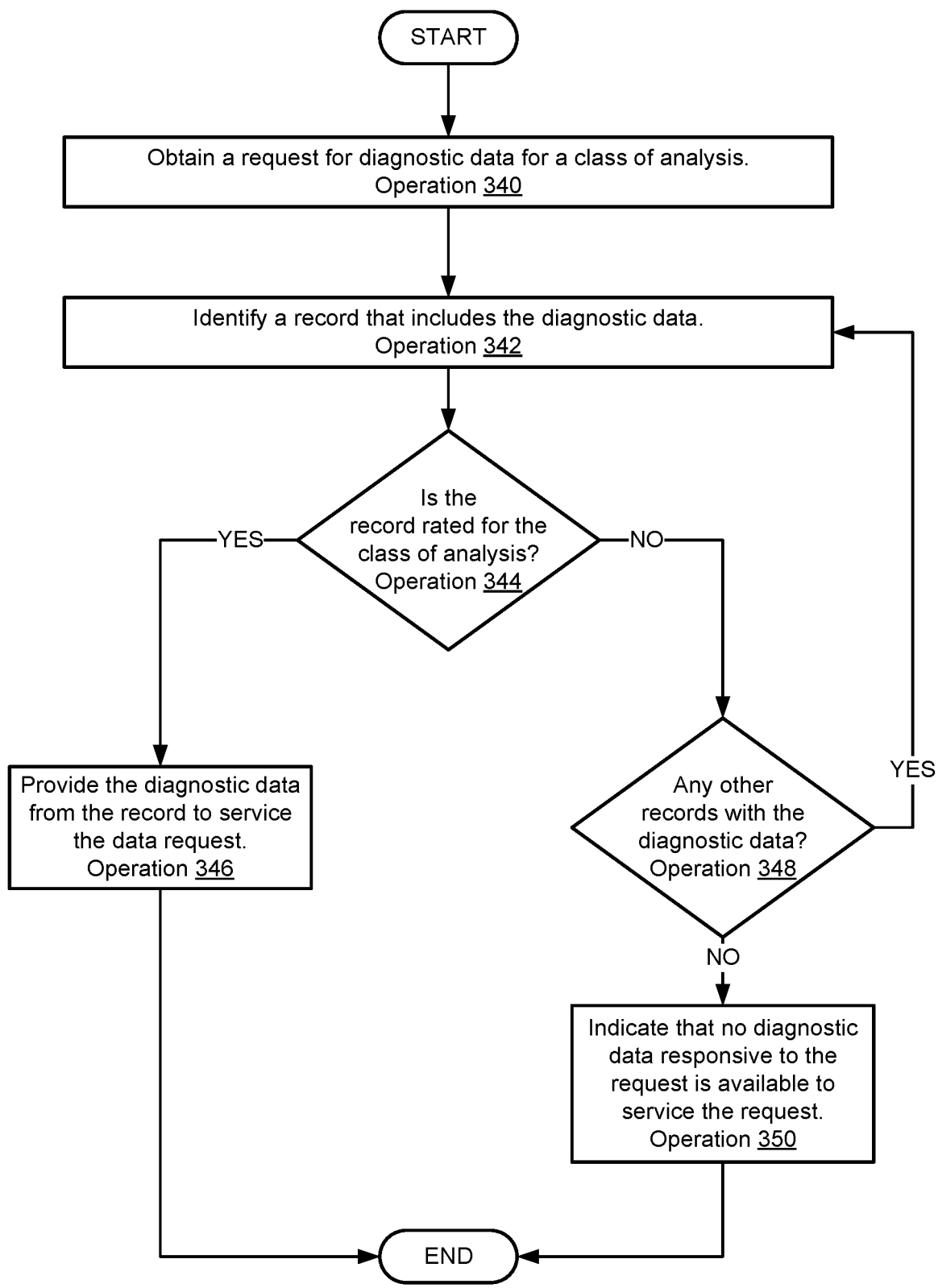

As discussed above, the components of FIG. 1 may perform various methods to manage operation of data processing systems. FIGS. 3A-3C illustrate methods that may be performed by the components of the system of FIG. 1. In the diagram discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method for managing data collection in accordance with an embodiment is shown. The method may be performed by any of data collector 100, additional data collectors 101, data management system 106, and/or other components of the system shown in FIG. 1.

Prior to operation 300, a person may interact with a healthcare provider to obtain medical services. As part of that process, the person may be instructed to provide the healthcare provider with information collectible using a data collector managed by the person rather than the healthcare provider (e.g., the data collector may not be part of a healthcare provider information technology system). For example, the healthcare provider may instruct the person to use their cell phone to collect diagnostic information which the healthcare provider may use to treat the person.

To facilitate acquisition of the diagnostic information, the person may be instructed to register their data collector with a healthcare provider information technology system (e.g., a data management system). To do so, the person may initiate the registration process by sending a request to the healthcare provider information technology system (e.g., by visiting a portal or other network accessible resource). The person may send the request using the data collector or another data processing system.

At operation 300, a request to register an unmanaged device (e.g., the data collector managed by the person) for collection of diagnostic data (e.g., which may include or otherwise represent the diagnostic information) may be obtained. The request may be obtained by receiving the request via a communication. For example, a data management system or another entity may manage a portal (e.g., a website) through which request for registration of devices may be registered. The person may provide the request via the portal.

The request may include (i) information regarding the person, (ii) information regarding the hardware components of the unmanaged device, (iii) information regarding software components of the unmanaged device, (iv) identification information (e.g., serial number, part number, product number, manufacturer, etc.) for the unmanaged device, and/or (v) other types of information usable to establish a registration for the unmanaged device.

The unmanaged device may be any type of data processing system that is not managed by the healthcare provider information technology system. For example, the unmanaged device may be a cell phone, smart watch, etc.

At operation 302, data collection hardware of the unmanaged device may be identified. The data collection hardware may be identified (i) using information included in the request, (ii) by obtaining information regarding the unmanaged device from the manufacturer or other source, (iii) by performing a lookup or other type of parsing operation using a data structure that specifies data collection hardware for different types of devices, and/or via other methods.

At operation 304, a capability test may be provided to the unmanaged device. The capability test may be based on the data collection hardware (e.g., based on the hardware components and/or the software components such as firmware, drivers, etc. of the data collection hardware).

The capability test may be provided by (i) obtaining the capability test, and (ii) providing the capability test to the unmanaged device. The capability test may be obtained by (i) reading the capability test from storage (e.g., different capability test for different types of data collection hardware may be stored in a data structure), (ii) obtaining the capability test from another device, (iii) generating the capability test (e.g., sub-tests for different data collection hardware components may be stored in a data structure, and the capability test may be generated by aggregating sub-tests corresponding to the data collection hardware components identified in operation 302), and/or via other methods.

The capability test may specify any number of actions to be performed by the unmanaged device and through which a data package may be obtained. The actions may include (i) activation of generative components (e.g., light emitting device, auditory generation devices, etc.), (ii) activation of sensing components (e.g., microphones, charge coupled devices, etc.), (iii) prompts to be displayed, (iv) user input to be collected during performance of the capability test, etc.

At operation 306, a measurement package from the unmanaged device may be obtained. The measurement package may be responsive to the capability test. In other words, the measurement package may include data specified by the capability test.

The measurement package may be obtained by receiving the measurement package from the unmanaged device, or another device.

At operation 308, the unmanaged device may be qualified for collection of at least a portion of the diagnostic data based on the measurement package. The unmanaged device may by qualified by (i) identifying levels of divergence of the data collection hardware from nominal operation, (ii) comparing the levels of divergence to thresholds or other criteria, and (iii) establishing procedures for processing different types of diagnostic data obtained using the data collection hardware based on the comparisons.

For example, consider a scenario in which an unmanaged device includes a microphone as part of data collection hardware. The measurement package may specify a dynamic range for the microphone. The dynamic range may be compared to an expected dynamic range for the microphone during nominal operation of the microphone. A delta between the dynamic range and the expected dynamic range may be identified. The delta may be analyzed using criteria (e.g., thresholds). The criteria may specify progressively larger deltas. Each of the criteria may be associated with different procedures for processing diagnostic data obtained using the microphone.

The procedures may include (i) adding metadata to the diagnostic data that specifies the extent of deviation of the dynamic range from the expected dynamic range, (ii) portions of the diagnostic data that are to be discarded (e.g., diagnostic data that is too close to the dynamic range limits for the microphone, indicating that such diagnostic data is not reliable), (iii) discarding all diagnostic data collected using the microphone (e.g., in cases in which the dynamic range deviates to such a large degree that any collected data is likely to be unreliable), and/or other types of procedures. In this scenario, procedures (i)-(iii) may each be associated with criteria that requires progressively larger deviations between the dynamic range and expected dynamic range for the microphone. Thus, depending on the actual performance of the microphone, the procedures for processing diagnostic data collected using the microphone may vary.

The procedures may be established by recording the procedures in a data structure and associating the procedures with the corresponding data collection hardware components. Any number of processing procedures may be established for any quantity of data collection hardware.

At operation 310, the unmanaged device is registered for collection of the at least the portion of the diagnostic data. The unmanaged device may be registered by (i) providing the unmanaged device with an identifier to identify itself to a data management system, (ii) providing the unmanaged device with cryptographic data usable to secure transmission of diagnostic data, and/or other information usable to identify itself the data management system, secure diagnostic data, and/or otherwise facilitate collection of diagnostic data. Additionally, the unmanaged device may be register by storing similar information in a record managed by the data management system. The record may also include (i) identifying information for the unmanaged device, (ii) associations to corresponding procedures for processing diagnostic data from the unmanaged system, (iii) associations to persons for which the diagnostic data is collection, and/or other types of information usable to manage diagnostic data collection.

The method may end following operation 310.

After registration, diagnostic data may be collected from the unmanaged device.

Turning to FIG. 3B, a flow diagram illustrating a method of collecting diagnostic data from unmanaged devices in accordance with an embodiment is shown. The method may be performed by any of data collector 100, additional data collectors 101, data management system 106, and/or other components of the system shown in FIG. 1.

Prior to operation 320, a data management system or another device may determine that diagnostic data for the patient may be desired for treatment purposes. A request for diagnostic data may be generated to obtain the diagnostic data.

At operation 320, a request for diagnostic data from an unmanaged device is obtained. The request for the diagnostic data may be obtained by (i) receiving the request from another device, (ii) generating the request (e.g., an application or other piece of software hosted by the unmanaged device may generate the request, or a data management system may generate the request), and/or via other methods. If the request is generated by a data management system, the request may be sent to the unmanaged device.

At operation 322, a data package that includes diagnostic data is obtained. The diagnostic data may be responsive to the request, or may be independent from the request. For example, a user of the unmanaged device may independently initiate collection of diagnostic data.

The data package may be obtained by receiving it from the unmanaged device, or another device.

At operation 324, a determination is made regarding whether the data package is valid. The determination may be made by (i) comparing identifying information (e.g., stamps) to corresponding information stored in records managed by a data management system for registered devices, and (ii) attempting to decrypt the data using cryptographic data established during registration of the unmanaged device. If the comparison indicates that the unmanaged device is not registered (e.g., no corresponding record) or that the data package cannot be decrypted, then it may be determined that the data package is not valid. If the comparison indicates that the unmanaged device is registered (e.g., no corresponding record) and that the data package can be decrypted, then it may be determined that the data package is valid.

If the data package is valid, then the method may proceed to operation 326. Otherwise the method may proceed to operation 330.

At operation 326, the diagnostic data from the data package that meets quality thresholds may be stored. The diagnostic data from the data package that meets quality thresholds may be stored by (i) identifying procedures for processing portions of the diagnostic data based on the data collection components used to obtain the respective portions, and (ii) implementing the procedures corresponding to the respective portions of the diagnostic data. In this manner, various portions may be (i) stored without modification, (ii) other portions may be stored with added metadata, (iii) various portions may be discarded without storing them, and (iv) all portions may be discarded if so specified by the procedures.

In the event that the data package also includes calibration data indicating the current capabilities of the data collection hardware of the unmanaged device when the diagnostic data was obtained, the calibration data may be used to at least temporarily update the procedures used to process the diagnostic data. For example, a similar qualification process as described with respect to operation 308 may be performed using the calibration data. The resulting procedures may be used to process the diagnostic data in the data package and/or may be used to update the procedures maintained by the data management system for the unmanage device.

At operation 328, a standards analysis of the diagnostic data is performed to identify a class of analysis. The class of analysis may be used for which the diagnostic data is relevant. Any number of classes of analysis may be identified.

The class of analysis may be identified by (i) identifying performance of data collection hardware (e.g., may be similar to operation 308) used to obtain portions of the diagnostic data, (ii) comparing the performance of the data collection hardware to various performance standards associated with different classes of analysis, and (iii) identifying any of the classes of analysis for which the performance of the data collection hardware met the performance standards.

At operation 330, the stored diagnostic data is associated with a person associated with the unmanaged device and the class of analysis to obtain a record. The stored diagnostic data may include different portions, each of which may be associated with the person and the corresponding classes of analysis for which the respective portions were qualified in operation 328. The stored diagnostic data may be associated by (i) adding metadata reflecting the associations, (ii) updating table or other data structures that define how stored data is associated with persons, and/or via other methods. The resulting data structure may be record or entry, as described with respect to FIG. 2D.

The method may end following operation 328.

Returning to operation 324, the method may proceed to operation 330 if the data package is not valid.

At operation 330, the data package is discarded. The data package may be discarded by deleting the data package without storing information regarding the data package for future use.

Metadata indicating that the data package had been obtained and discarded may be stored for future use.

The method may end following operation 330.

Using the methods illustrated in FIGS. 3A-3B, embodiments disclosed here in may facilitate collection of diagnostic data from unmanaged devices while improving the likelihood that the collected diagnostic data is usable for diagnostic purposes. For example, the disclosed methods may reduce the likelihood of malicious entities interjecting falsified diagnostic data and improve the likelihood that limits on the quality of the collected diagnostic data are understood by users (e.g., healthcare providers) of the diagnostic data.

In contrast to managed devices which may undergo regular maintenance and performance testing, may generally be secured physically, and may otherwise be less likely to provide low quality or malicious information, unmanaged device may not be similarly managed. However, by virtue of these management procedures for managed devices, the managed devices may be less able to provide large amounts of diagnostic data over time for different persons (e.g., to logistic and cost requirements). These limits may reduce the likelihood of successfully diagnosing patient conditions by virtue of limited quantities of diagnostic data availability for persons. By facilitating supplementation of diagnostic data collection through unmanaged devices, embodiments disclosed herein may improve the likelihood of successful diagnosis and treatment through increased collection of diagnostic data.

Turning to FIG. 3C, a flow diagram illustrating a method of providing data usable for diagnostic purposes in accordance with an embodiment is shown. The method may be performed by any of data collector 100, additional data collectors 101, data management system 106, and/or other components of the system shown in FIG. 1.

At operation 340, a request for diagnostic data is obtained for a class of analysis. The request may be obtained by (i) receiving it from another device, (ii) obtaining user input indicating the request, and/or via other methods.

At operation 342, a record that includes the diagnostic data is identified. The record may be identified by (i) identifying a type of the diagnostic data, and (ii) discriminating entries (e.g., 280) that include the type of the diagnostic data from other entries (e.g., 286). The discrimination may be performed using a lookup or other processing operation. The records may be discriminated records.

At operation 344, a determination is made regarding whether the record is rated for the class of analysis. The determination may be made by comparing the class of analysis-to-analysis identifiers included in the matched records. If any of the analysis identifiers match the class of analysis, then it may be determined that the record is rated for the class of analysis.

If the records are rated for the class of analysis, then the method may proceed to operation 346. Otherwise the method may proceed to operation 348.

At operation 346, the diagnostic data may be provided from the record to service the data request. The diagnostic data may be provided by sending the diagnostic data to a request entity.

The method may end following operation 346.

Returning to operation 344, the method may proceed to operation 348 following operation 344 if the record is not rated for the class of analysis.

At operation 348, a determination is made regarding whether any other records include the diagnostic data. The determination may be made by ascertaining whether any of the records discriminated in operation 342 have not yet been analyzed as set forth in operation 344. If any of the discriminated records have not yet been analyzed, then it may be determined that other records also include the diagnostic data.

If any of the other records include the diagnostic data, then the method may proceed to operation 342. Otherwise, the method may proceed to operation 348.

The method may proceed to operation 342, for example, in a scenario in which a first discriminated record includes the diagnostic data but at a degree of fidelity such that it is not rated for the class of analysis but a second discriminated record also includes similar diagnostic data (at a similar or different degree of fidelity, but that has not yet been analyzed under the criteria set out in operation 344).

If the method returns to operation 342 following operation 348, then one of these not yet analyzed but discriminated records may be identified as the record, and subject to analysis as set out in operation 344.

At operation 350, it is indicated (e.g., to a requestor) that no responsive diagnostic data is available to service the request. The lack of responsive diagnostic data may be indicated by sending a message to the requestor indicating that no relevant diagnostic data is available.

The method may end following operation 350.

Using the method illustrated in FIG. 3C, embodiments disclosed here may facilitate distribution of diagnostic data that is relevant for certain uses, while screening diagnostic data that is irrelevant for other uses. By doing so, users of the data may be less likely to misinterpret or misuse the data thereby improving the likely outcomes of treatment plans.

Figure 4:
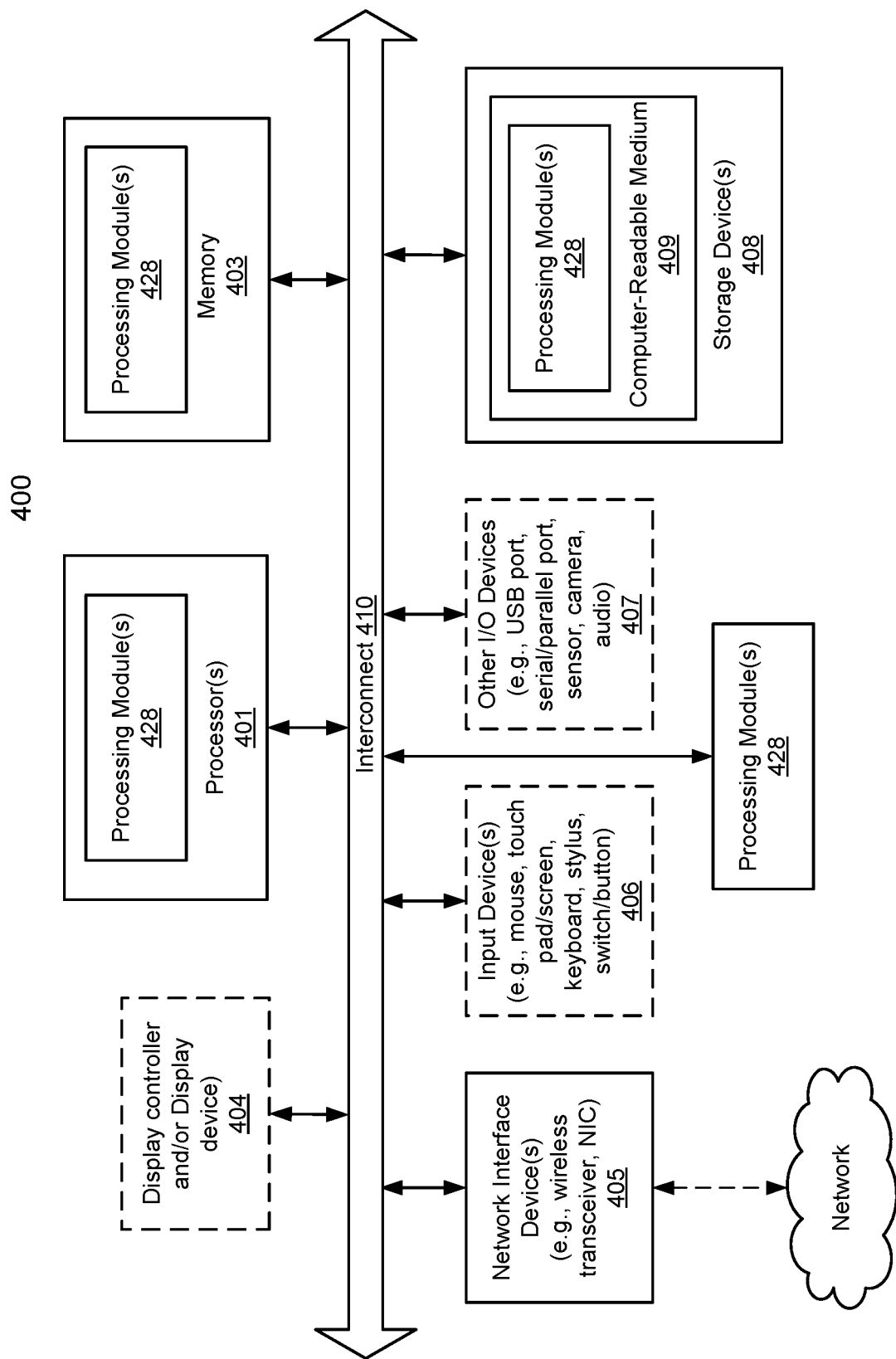
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing electronic collection of medical diagnostic data for individuals through use of managed devices and unmanaged devices for the electronic collection of the medical diagnostic data, the method being performed by a data collection system with direct management control over the managed devices and without direct management control over the unmanaged devices, and the method comprising:

obtaining the medical diagnostic data from an unmanaged device of the unmanaged devices, the unmanaged device being a personal electronic device that is directly managed by a person for which the medical diagnostic data is collected, the person being one of the individuals;

making a first determination regarding whether the medical diagnostic data is valid by determining whether the unmanaged device is a registered device that is registered with the data collection system; and in a first instance of the first determination where the medical diagnostic data is valid, and by the data collection system:

performing a standards analysis for the medical diagnostic data to identify at least one class of analysis to which the medical diagnostic data belongs and that indicates a quality of the medical diagnostic data, the standards analysis being based at least in part on a qualification of data collection hardware of the unmanaged device used to perform measurements through which the medical diagnostic data is acquired, the qualification of data collection hardware of the unmanaged device indicating capabilities and qualifications of one or more hardware components of the unmanaged device that were used to obtain the medical diagnostic data for the person;

generating a storage record for the medical diagnostic data based on the medical diagnostic data, the at least one class of analysis, and the person, the storage record being one of a plurality of storage records stored and managed by the data collection system;

obtaining a data request that specifies the person, a class of analysis, and a type of the medical diagnostic data, the data request originating from a requestor for the medical diagnostic data;

making a second determination, using on the plurality of storage records, whether the at least one class of analysis meets the class of analysis; and in a first instance of the second determination where the at least one class of analysis meets the class of analysis: providing the medical diagnostic data to the requestor to fulfill the data request.

2. The method of claim 1, wherein performing the standards analysis comprises:

for a first portion of the medical diagnostic data obtained using a first component of the data collection hardware:
identifying a level of performance of the component;
comparing the level of performance to thresholds associated with classes of analysis to identify at least one threshold that is met by the level of performance; and
establishing the at least one class of analysis based on the at least one threshold.

3. The method of claim 2, wherein the classes of analysis are for patient diagnosis, and the thresholds specify minimum acceptable performance levels for the data collection hardware for the patient diagnosis.

4. The method of claim 1, wherein generating the storage record comprises:
identifying second medical diagnostic data obtained from a second unmanaged device;
making a third determination regarding whether the medical diagnostic data or the second medical diagnostic data is more reliable;
in a first instance of the third determination where the medical diagnostic data is more reliable:
populating the storage record using the medical diagnostic data; and
in a second instance of the third determination where the second medical diagnostic data is more reliable:
populating the storage record using the second medical diagnostic data.

5. The method of claim 4, wherein making the third determination comprises:
comparing performance data for data collection hardware of the unmanaged device to performance data for data collection hardware of the second unmanaged device.

6. The method of claim 5, wherein the performance data for the data collection hardware of the unmanaged device is based on real world testing.

7. The method of claim 1, further comprising:
in a second instance of the second determination where the at least one class of analysis does not meet the class of analysis:
making a third determination regarding whether any other ones of the plurality of storage records comprise other medical diagnostic data that meets the class of analysis:
in an instance of the third determination where none of the other ones of the plurality of storage records comprise the other medical diagnostic data that meets the class of analysis:
indicating to a requestor that initiated the data request that no responsive data is available.

8. A non-transitory machine-readable medium having instructions stored therein, which when executed by a processor of data collection system with direct management control over managed devices and without direct management control over unmanaged devices, cause the processor to perform operations for managing electronic collection of medical diagnostic data for individuals through use of the managed devices and the unmanaged devices for the electronic collection of the medical diagnostic data, the operations comprising:
obtaining the medical diagnostic data from an unmanaged device of the unmanaged devices, the unmanaged device being a personal electronic device that is directly managed by a person for which the medical diagnostic data is collected, the person being one of the individuals;
making a first determination regarding whether the medical diagnostic data is valid by determining whether the unmanaged device is a registered device that is registered with the data collection system; and
in a first instance of the first determination where the medical diagnostic data is valid, and by the data collection system:
performing a standards analysis for the medical diagnostic data to identify at least one class of analysis to which the medical diagnostic data belongs and that indicates a quality of the medical diagnostic data, the standards analysis being based at least in part on a qualification of data collection hardware of the unmanaged device used to perform measurements through which the medical diagnostic data is acquired, the qualification of data collection hardware of the unmanaged device indicating capabilities and qualifications of one or more hardware components of the unmanaged device that were used to obtain the medical diagnostic data for the person;
generating a storage record for the medical diagnostic data based on the medical diagnostic data, the at least one class of analysis, and the person, the storage record being one of a plurality of storage records stored and managed by the data collection system;
obtaining a data request that specifies the person, a class of analysis, and a type of the medical diagnostic data, the data request originating from a requestor for the medical diagnostic data;
making a second determination, using on the plurality of storage records, whether the at least one class of analysis meets the class of analysis; and
in a first instance of the second determination where the at least one class of analysis meets the class of analysis: providing the medical diagnostic data to the requestor to fulfill the data request.

9. The non-transitory machine-readable medium of claim 8, wherein performing the standards analysis comprises:
for a first portion of the medical diagnostic data obtained using a first component of the data collection hardware:
identifying a level of performance of the component;
comparing the level of performance to thresholds associated with classes of analysis to identify at least one threshold that is met by the level of performance; and
establishing the at least one class of analysis based on the at least one threshold.

10. The non-transitory machine-readable medium of claim 9, wherein the classes of analysis are for patient diagnosis, and the thresholds specify minimum acceptable performance levels for the data collection hardware for the patient diagnosis.

11. The non-transitory machine-readable medium of claim 8, wherein generating the storage record comprises:
identifying second medical diagnostic data obtained from a second unmanaged device;
making a third determination regarding whether the medical diagnostic data or the second medical diagnostic data is more reliable;
in a first instance of the third determination where the medical diagnostic data is more reliable:
populating the storage record using the medical diagnostic data; and
in a second instance of the third determination where the second medical diagnostic data is more reliable:
populating the storage record using the second medical diagnostic data.

12. The non-transitory machine-readable medium of claim 11, wherein making the third determination comprises:

comparing performance data for data collection hardware of the unmanaged device to performance data for data collection hardware of the second unmanaged device.

13. The non-transitory machine-readable medium of claim 12, wherein the performance data for the data collection hardware of the unmanaged device is based on real world testing.

14. The non-transitory machine-readable medium of claim 8, wherein the operations further comprise:
in a second instance of the second determination where the at least one class of analysis does not meet the class of analysis:
making a third determination regarding whether any other ones of the plurality of storage records comprise other medical diagnostic data that meets the class of analysis:
in an instance of the third determination where none of the other ones of the plurality of storage records comprise the other medical diagnostic data that meets the class of analysis:
indicating to a requestor that initiated the data request that no responsive data is available.

15. A data processing system configured as a data collection system with direct management control over managed devices and without direct management control over unmanaged devices, comprising:
a processor; and
a memory coupled to the processor to store instructions, which when executed by the processor, cause the processor to perform operations for managing electronic collection of medical diagnostic data for individuals through use of the managed devices and the unmanaged devices for the electronic collection of the medical diagnostic data, the operations comprising:
obtaining the medical diagnostic data from an unmanaged device of the unmanaged devices, the unmanaged device being a personal electronic device that is directly managed by a person for which the medical diagnostic data is collected, the person being one of the individuals; and
making a first determination regarding whether the medical diagnostic data is valid by determining whether the unmanaged device is a registered device that is registered with the data collection system;
in a first instance of the first determination where the medical diagnostic data is valid, and by the data collection system:
performing a standards analysis for the medical diagnostic data to identify at least one class of analysis to which the medical diagnostic data belongs and that indicates a quality of the medical diagnostic data, the standards analysis being based at least in part on a qualification of data collection hardware of the unmanaged device used to perform measurements through which the medical diagnostic data is acquired, the qualification of data collection hardware of the unmanaged device indicating capabilities and qualifications of one or more hardware components of the unmanaged device that were used to obtain the medical diagnostic data for the person;
generating a storage record for the medical diagnostic data based on the medical diagnostic data, the at least one class of analysis, and the person, the storage record being one of a plurality of storage records stored and managed by the data collection system;
obtaining a data request that specifies the person, a class of analysis, and a type of the medical diagnostic data, the data request originating from a requestor for the medical diagnostic data;
making a second determination, using on the plurality of storage records, whether the at least one class of analysis meets the class of analysis; and
in a first instance of the second determination where the at least one class of analysis meets the class of analysis: providing the medical diagnostic data to the requestor to fulfill the data request.

16. The data processing system of claim 15, wherein performing the standards analysis comprises:
for a first portion of the medical diagnostic data obtained using a first component of the data collection hardware:
identifying a level of performance of the component;
comparing the level of performance to thresholds associated with classes of analysis to identify at least one threshold that is met by the level of performance; and
establishing the at least one class of analysis based on the at least one threshold.

17. The data processing system of claim 16, wherein the classes of analysis are for patient diagnosis, and the thresholds specify minimum acceptable performance levels for the data collection hardware for the patient diagnosis.

18. The data processing system of claim 15, wherein generating the storage record comprises:
identifying second medical diagnostic data obtained from a second unmanaged device;
making a third determination regarding whether the medical diagnostic data or the second medical diagnostic data is more reliable;
in a first instance of the third determination where the medical diagnostic data is more reliable:
populating the storage record using the medical diagnostic data; and
in a second instance of the third determination where the second medical diagnostic data is more reliable:
populating the storage record using the second medical diagnostic data.

19. The data processing system of claim 18, wherein making the third determination comprises:
comparing performance data for data collection hardware of the unmanaged device to performance data for data collection hardware of the second unmanaged device.

20. The data processing system of claim 19, wherein the performance data for the data collection hardware of the unmanaged device is based on real world testing.

* * * * *